Nov. 3, 1959
J. E. FREEMAN
2,911,156
LAWN SPRINKLER CONTROLLER
Filed Oct. 25, 1957
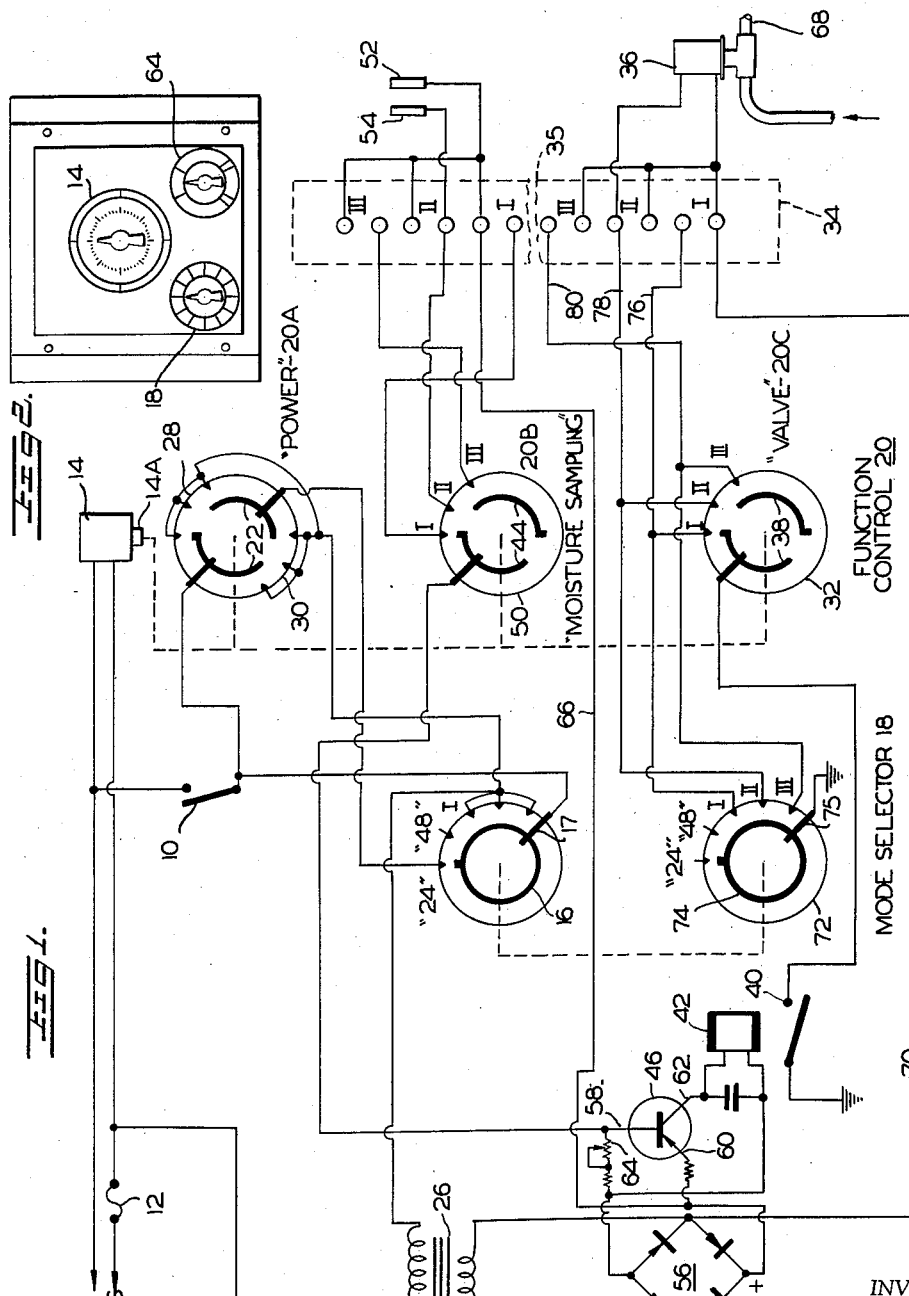
INVENTOR
JEFF E. FREEMAN
BY *John S. Roberts, Jr.*
ATTORNEY

2,911,156

Patented Nov. 3, 1959

2,911,156
LAWN SPRINKLER CONTROLLER

Jeff E. Freeman, Fort Worth, Tex., assignor to Lek Trol, Inc., Arlington, Tex., a corporation of Texas Application October 25, 1957, Serial No. 692,291

7 Claims. (Cl. 239—63)

The present invention relates to a device for controlling the amount of water sprayed on a given lawn or garden area. In a particular mode of operation the device may automatically regulate the amount of water sprayed depending upon the moisture content of the soil.

Lawn sprinkler systems are presently available in standard types which are designed to spray a plurality of predetermined areas. Such systems may utilize either a surface or an underground pipe arrangement to distribute the water to the several sprinkler heads which serve each area. Water valves are incorporated in such systems to control the sprinkling of one or more chosen lawn areas. Electrically actuated water flow control valves are available to provide remote operation of the lawn sprinkler systems.

An object of this invention is to provide an electronic controller device which periodically senses the amount of moisture contained in the soil. When the moisture content falls below a preselected level, the controller will turn on the watering system for sprinkling the lawn, garden, or orchard area. The sprinklers will remain on until the soil has received a sufficient amount of moisture to raise it above the preselected level.

A further object of this invention is to provide electrically operated control apparatus for actuating a multiplicity of sprinkler lines in sequence with each line being actuated only if the soil area which it serves requires moisture.

A more specific object of this invention is to provide a transistor device of a simplified basic design comprising a minimum of moving parts thereby assuring an item having a long trouble free operating life and which is economical to manufacture.

Another object of this invention is to provide an automatic timed sprinkler controller having means for selecting either a daily or an alternate day watering schedule.

A related object of this invention is to provide, in an automatic timed electronic sprinkler controller, means whereby both the automatic and time sequence functions may be overridden to permit any portion of the soil area to be watered for any desired time period.

Other and further objects of this invention will be apparent to those skilled in the art from the following detailed description of a preferred form of the invention when considered with the accompanying drawings, wherein:

Figure 1 is a schematic representation of the electrical components and their arrangement in a preferred circuit to control the water distribution in a sprinkler system, and Figure 2 is a view of a control panel used with the circuit of Figure 1.

Automatic operation

Reference numeral 10 indicates a power switch by means of which line voltage, nominally 115 volt, 60 cycle alternating current, is applied to the controller. A fuse 12 is provided to protect the unit. Closing switch 10 applies the line voltage to the rotor 16 of the "Mode Selector" switch 18. A synchronous timing clock motor 14 is continuously energized from the source of line voltage. During automatic operation of the controller two sequences of timed operations, namely 24 or 48 hours, are available according to the switch position selected on the switch 18, as described hereafter.

Timer motor 14 has a gear arrangement which rotates the output shaft 14A one revolution during each 48 hour period. Attached to this shaft is a free turning, rotary switch 20 comprising three elements or decks 20A, 20B and 20C. Deck 20A is designated the "Power" deck; deck 20B the "Moisture Sampling" deck; and deck 20C the "Valve" deck, as indicated by the drawing legends. The entire switch assembly 20 is designated as the "Function Control."

The stator 28, 30 of the power element of rotory switch 20 connects to the primary winding of stepdown transformer 26. The stator contact areas of deck 20A are in two groups spaced 180° from each other. Therefore, when the motor drives the rotary wiper arm 22 onto the stator contacts, excitation voltage will be applied to the transformer 26 for a certain period of time. The reason for having two identical contact areas spaced 180° apart is to provide either 24 hour or 48 hour cyclic operation of the sprinkler control system. It can readily be observed that with the mode selector switch 18 in position "48," no voltage will be applied to the second group of stator contacts 30 on power deck 20A. Under these conditions, power will be routed to the moisture sampling circuits only once during every 48 hour period of time. Similarly, in position "24," excitation voltage is applied to the second group of stator contacts 30. Under this condition, the power will be applied to the moisture sampling circuits once every 24 hour period of time.

The stator 32 of the valve deck 20C also consists of two groups of contacts spaced 180° from each other similar to those of deck 20A. Only one such group has been shown in order to avoid unduly complicating the drawing. Each contact is connected through a terminal strip 34 to a solenoid operated water control valve 36. The rotor 38 of the valve control deck 20C is connected to the power contact 40 of relay 42. The rotor 44 of the moisture sampling deck 20B is connected to the base of transistor 46. The stator 50 of the moisture sampling deck 20B has two groups of contacts spaced 180° from each other similar to those of deck 20A, with the second group not shown. Each contact is connected through terminal strip 34 to moisture sampling probes 52 and 54 which are buried in the soil.

Terminal strip 34 as shown in the drawings comprises twelve terminals or connection points to control the watering of three predetermined lawn areas. Such lawn areas are designated Lawn Area I, Lawn Area II, and Lawn Area III in the remainder of this specification. It will be obvious that terminal strip 34 may contain a greater number of connection points in order to serve a greater number of lawn areas. As many as ten such areas may be controlled in a preferred embodiment of the invention, with the additional connection points inserted in the terminal strip as indicated at the broken lines 35.

For each controlled lawn area four connection points are required on the terminal strip. These connections are preferably arranged in pairs, with one pair at the lower portion of the terminal strip, and a corresponding pair at the upper portion. The drawing indicates, by means of Roman numerals I, II, and III such pairs of connection points. At the lower portion of terminal strip 34 these pairs of connections distribute the low voltage D.C. to actuate the water control valve 36 for a particular lawn area. At the upper portion of strip 34 corresponding pairs of connections are provided to serve the moisture sampling probes 52 and 54 of each lawn area. The valve and probes illustrated in the drawing serve the Lawn Area II.

The rotors and stators of the three elements of rotary switch 20 are so oriented when coupled to the electric motor output shaft that all stations work in synchronization. For example, power is applied to the moisture sampling circuit for Lawn Area I when the moisture probes for Area I are connected into the circuit. At this same time, the electrical leads for the electrically operated water control valve for Lawn Area I are also connected into the circuit.

The moisture sampling circuit becomes operative when excitation voltage is applied to the transformer 26, which in turn causes a D.C. potential developed by rectifier 56 to appear at the base 58 of transistor 46. The polarity of this potential with respect to the potential at soil moisture probe 52 is negative. The value of this negative potential will be dependent upon the moisture content of the soil between probes 52 and 54. A variable moisture control potentiometer 64 is provided to adjust the value of this negative signal with respect to the amount of moisture content of the soil.

As the soil between probes 52 and 54 dries out, its conductivity decreases. This decrease causes the potential at the base 58 of the transistor 46 to become more negative, since less of the positive potential supplied from the rectifier to the probe 52 over conductor 66 reaches the probe 54. When the transistor base potential reaches a given value, as determined by a preset resistance in moisture control resistor 64, current will flow between the collector 62 and the emitter 60 of the transistor. Relay 42 is connected in series between the collector of the transistor and the positive terminal of rectifier 56; therefore, whenever current flows through the transistor, such current must flow through relay 42. When the current flow through transistor 46 has increased to the pull-in value of the relay, the contacts of the relay will close. With the relay contacts closed, voltage will be applied to the electrically operated water valve 36, causing it to become energized. This action will cause water to flow to the sprinkler heads which are attached to the distribution pipe 68 for a particular lawn area.

When a sufficient amount of water has soaked into the soil to the depth of the moisture probes, the conductivity of the soil between the probes will increase accordingly. As the conductivity increases, the negative potential at the base of the transistor is reduced. This in turn will cause a reduced amount of current to flow through the transistor and the relay. The above described process will continue until the current flow is reduced below the point where relay 42 will remain energized. When the relay becomes de-energized, its contacts will open, thereby removing voltage from the electrically operated water valve, which in turn will cause the valve to close, stopping the flow of water to the sprinkler heads.

To summarize the operation of a complete cycle: Assume for the sake of discussion that three electrically operated water control valves are being used to control the watering of three predetermined lawn areas I, II and III. The selected hours for watering are between 12 p.m. and 6 a.m. The mode selector switch 18 is in the "24" hour position as indicated in the drawing. As the electric motor 14 drives the rotor 22 of the power deck 20A to the 12 p.m. position shown in the drawing, it contacts the stator contact for Lawn Area I. This causes 115 volt, 60 cycle A.C. excitation voltage to flow into the primary winding of transformer 26. Simultaneously, the rotors 38 and 44 of the valve and moisture sampling decks, respectively, arrive at the stator contacts for Lawn Area I. In this position, if the soil contains less moisture than that required by the setting of the moisture control resistor 64, the negative D.C. potential on base 58 of transistor 46 will be high enough to cause current to flow through it. When current flows through the transistor it also flows through relay 42, since it is connected in series with the transistor. The current flow through relay 42 causes it to be energized, thereby closing its contacts. With the relay contacts 40 closed, D.C. voltage flows through the valve deck 20C to the electrically operated water control valve 36, causing it to be energized. This allows water to flow to the sprinkler heads attached to this water control valve, namely, Lawn Area I. When the water from the sprinkler heads in Lawn Area I has seeped down to the depth of the moisture probes 52 and 54, the conductivity between them begins to increase. This causes the negative D.C. potential at the base of the transistor to decrease. When the potential has decreased to a point where current no longer flows through the transistor, relay 42 becomes de-energized and contacts 40 open, stopping the D.C. voltage flow to the electrically operated water control valve. This in turn causes the valve to close, stopping the watering cycle for the Lawn Area I.

Meanwhile, the electric motor 14 is driving rotors 22, 38 and 44 of the function control switch into position where Lawn Area II will be served. The width of the contacts on the rotary switch elements are selected to allow adequate watering time for each of the lawn areas. Now the watering cycle as described above for Lawn Area I starts all over again for Lawn Area II. This process continues until all of the lawn areas have been served. In the event that the soil of a particular lawn area is sufficiently moist, as determined by its moisture sampling probes, then the valve for such area will not be actuated. After 6 a.m. the timing motor has driven the rotor 22 of the power deck 20A beyond the first group of active contacts. This removes the excitation voltage from the transformer 26 and de-energizes the moisture sampling circuits.

The electric motor continues to run and 24 hours from the beginning of the original watering cycle, it has driven the rotors of the function control switch 20 through an arc of 180°. At this point, the rotors engage the second group of active stator contacts. Since the stator contact position serving Lawn Area I is tied in electrically to its counterpart 180° opposite on elements 30, 32 and 50, voltage which is applied to either stator contact will activate Lawn Area I. The watering cycle repeats itself, testing the soil moisture content in each lawn area. If such moisture content is below that required, the electrically controlled water valve will be turned on until the soil reaches the desired moisture content. If the mode selector switch 18 is left in the "24" hour position, the cycle described above will repeat every 24 hours. However, when the mode selector switch is left in the "48" hour position, then excitation voltage will be applied to the transformer 26 only once in each 48 hour period of time and the moisture sampling process likewise will take place only once in each 48 hour period of time, together with watering for the various lawn areas, if required.

*Manual operation*

Where manual operation of all or any particular one of the water control valves is desired, the mode selector switch 18 would be turned into the manual range I, II, III, etc., beyond the positions "24" and "48," and the switch pointer set at the desired valve number which corresponds to the selected lawn area. Accordingly, when dealing with manual operation, it is to be noted that a pointer position on the mode selector switch 18 is provided as indicated in Figure 2 for each electrically operated water control valve of each lawn area. It follows that when mode selector switch 18 is placed on the Lawn Area I position, the rotor 16 would be contacting position I on the stator contact. This contact is connected electrically with the primary winding of the transformer 26. Therefore, when power switch 10 is in the "on" position and the mode selector switch 18 is in position I, excitation voltage flows via rotor brush 17 and rotor 16 to the transformer 26 and the resultant stepped-down secondary voltage is in turn applied over conductor 70 to the common valve energizing connection points of the lower portion of terminal strip 34. The remaining valve energizing connection points of each lawn area pair are connected electrically by conductors 76, 78 and 80 to the stator 72 of the lower deck of the mode selector switch at the pointer positions I, II, III, etc. The rotor 74 of this deck has its brush 75 grounded and, since the rotors 16 and 74 of the mode selector switch move simultaneously, rotor 74 is also contacting stator contact position I. This completes the electrical circuit to the electrically operated water control valve 36 and it now opens this valve, allowing water to flow to the sprinkler heads. Each electrically operated water control valve being used will operate in the same manner, provided the mode selector switch 18 is placed on the appropriate lawn area position. As long as the power switch 10 is in an "on" position and the mode selector switch is on a particular lawn area position number in the manual range, the valve selected will continue to be energized and allow watering to take place. Only by turning the power switch "off" or by returning the mode selector switch to the automatic range, namely, "24" or "48," will the water control valve selected be de-energized. This, of course, will close the valve in question and thereby shut off the water to the sprinkler heads in that lawn area.

In Figure 2 the representative control panel dial positions have been indicated for the mode selector switch 18, the moisture control potentiometer 64, and the sequence timing clock 14. Each of these control dials is provided with a pointer or bar-knob to adjust the associated control shaft.

The pointer for clock 14 is the usual one provided in order to set the timing mechanism to the correct time of day when the apparatus is connected to the source of line voltage. The clock face dial corresponds to the position of output shaft 14A which drives the rotary function control switch 20 and indicates a 48 hour period. Four 12 hour quadrants may be indicated on the dial face with 12 p.m. midnight at the topmost position.

The dial for the moisture control potentiometer 64 may conveniently be graduated into three major areas which are designated "dry," "medium" and "wet." The power switch 10 may be readily ganged for operation by the moisture control potentiometer shaft, and the control panel dial may conveniently carry "on-off" indicia.

The remaining pointer in Figure 2 operates the mode selector switch 18. Dial positions for this switch correspond to the switch positions indicated by the drawing legends of Figure 1 for the lower deck stator 72. Thus, the dial will indicate a first or topmost position "24," a next position "48," and further positions I, II, III, etc., for each lawn area to be served under manual control. Figure 2 indicates twelve dial positions for the mode selector switch pointer, which will thus accommodate ten designated lawn areas.

While a particular embodiment of this invention has been described in detail, it is of course understood that the invention need not be limited to the exact details described for many modifications and variations are possible within the scope of the following claims.

I claim:

1. Apparatus for electrically controlling the sprinkling or irrigation of soil at a plurality of separate soil areas by the control of a corresponding plurality of solenoid valves including a two-terminal primary source of electrical energy for the apparatus, a timing clock energized therefrom, a shaft driven by said clock one revolution per predetermined time period, a plurality of oriented rotary switch contact decks each including a rotary wiper contact arm connected to said shaft, and associated spaced arcuate circumferential stator contacts, soil moisture sampling probe means connected to at least one stator contact on a first switch deck, a solenoid actuated water valve connected to at least one corresponding stator contact on a second switch deck, trigger circuit means connected to the rotary wiper contact arm of said first switch deck and responsive to the sampling probe means to selectively energize a relay at a predetermined soil moisture level, and normally open relay contacts interconnecting the rotary wiper contact arm of said second switch deck and a secondary source of energy for said solenoid actuated valve.

2. Electrical control apparatus as in claim 1 wherein said trigger circuit means includes a biased transistor stage.

3. Electrical control apparatus as in claim 1 wherein said trigger circuit means includes a transistor stage with an adjustable bias level, which level determines the soil moisture level.

4. Electrical control apparatus as in claim 1 wherein duplicate stator contacts are provided on each switch deck spaced 180 mechanical degrees apart circumferentially.

5. Electrical control apparatus as in claim 1 wherein duplicate stator contacts are provided on each switch deck spaced 180 mechanical degrees apart circumferentially, to selectively control the soil irrigation for either one half or both halves of the predetermined time period.

6. Electrical control apparatus as in claim 1 wherein the trigger circuit means and the secondary source of energy are selectively energized from one terminal of the primary source of electrical energy over a conductor connected to at least one corresponding stator contact on a third switch deck, and a return conductor connected to the rotary wiper contact arm thereof through selector switch means to the other terminal of said primary energy source.

7. Electrical control apparatus as in claim 6 wherein the said selector switch means opens the circuit of the return conductor for a portion of said predetermined time period.

References Cited in the file of this patent

UNITED STATES PATENTS

| | | |
|---|---|---|
| 1,606,245 | Lang | Nov. 9, 1926 |
| 2,674,490 | Richards | Apr. 6, 1954 |
| 2,785,006 | Young et al. | Mar. 12, 1957 |
| 2,821,434 | Hunter et al. | Jan. 28, 1958 |

UNITED STATES PATENT OFFICE
CERTIFICATE OF CORRECTION

Patent No. 2,911,156                      November 3, 1959

Jeff E. Freeman

It is hereby certified that error appears in the printed specification of the above numbered patent requiring correction and that the said Letters Patent should read as corrected below.

Column 2, line 71, and column 4, lines 6 and 17, for "D.C." read -- A.C. --.

Signed and sealed this 26th day of April 1960.

(SEAL)
Attest:

KARL H. AXLINE
Attesting Officer

ROBERT C. WATSON
Commissioner of Patents